(12) United States Patent
Elseser

(10) Patent No.: US 11,987,166 B1
(45) Date of Patent: May 21, 2024

(54) REMOTELY CONTROLLED TWISTLOCK ASSEMBLY

(71) Applicant: Buffers USA, Inc., Jacksonville, FL (US)

(72) Inventor: Jeffrey Elseser, St. Augustine, FL (US)

(73) Assignee: BUFFERS USA, INC., Jacksonville, FL (US)

( * ) Notice: Subject to any disclaimer, the term of this patent is extended or adjusted under 35 U.S.C. 154(b) by 677 days.

(21) Appl. No.: 17/204,146

(22) Filed: Mar. 17, 2021

Related U.S. Application Data

(60) Provisional application No. 62/990,691, filed on Mar. 17, 2020.

(51) Int. Cl.
*B60P 7/13* (2006.01)

(52) U.S. Cl.
CPC .................................. *B60P 7/132* (2013.01)

(58) Field of Classification Search
CPC ...................................................... B60P 7/132
USPC ............................................................ 410/82
See application file for complete search history.

(56) References Cited

U.S. PATENT DOCUMENTS

| | | | | |
|---|---|---|---|---|
| 3,486,787 A * | 12/1969 | Whittington | ........... | B62D 21/02 410/83 |
| 3,545,713 A * | 12/1970 | Hamilton | ............. | B61D 45/007 410/83 |
| 3,751,096 A * | 8/1973 | Wyon | ..................... | B66C 1/663 294/81.53 |
| 3,924,544 A * | 12/1975 | Grau | ........................ | B60P 7/132 410/83 |
| 5,931,617 A * | 8/1999 | Kroll | ........................ | B60P 7/132 410/94 |
| 6,092,967 A * | 7/2000 | Schulz | .................... | B60P 7/132 410/82 |

(Continued)

FOREIGN PATENT DOCUMENTS

| | | | | |
|---|---|---|---|---|
| BE | 1014698 A6 * | 3/2004 | .............. | B60P 1/283 |
| DE | 102007007067 A1 * | 8/2008 | .............. | B60P 7/132 |

(Continued)

*Primary Examiner* — Hilary L Gutman
(74) *Attorney, Agent, or Firm* — BROWDY AND NEIMARK, P.L.L.C.

(57) ABSTRACT

A remotely controlled twistlock assembly includes a T-shaped twistlock locking pin and a twistlock housing within which the T-shaped twistlock locking pin is mounted. A motion converter is mounted within the twistlock housing and is connected to the T-shaped twistlock locking pin. A remotely controlled pin actuator is linked to the motion converter in a manner such that extension and retraction of the pin actuator causes rotation of the motion converter and the T-shaped twistlock locking pin. A latch is mounted within the twistlock housing and is engageable with the motion converter such that the latch locks the motion converter when the latch is engaged with the motion converter and unlocks the motion converter when the latch is disengaged from the motion converter. A remotely controlled latch actuator is linked to the latch in a manner such that retraction and extension of the latch actuator controls engagement and disengagement of the latch with the motion converter. At least one feedback device is mounted within the twistlock housing and is positioned to provide remote reporting of a position of at least one of the motion converter and the latch.

20 Claims, 10 Drawing Sheets

(56) References Cited

U.S. PATENT DOCUMENTS

| | | | | |
|---|---|---|---|---|
| 9,021,671 B2 * | 5/2015 | Kapelski | .............. | B65D 90/002 |
| | | | | 410/82 |
| 2008/0193246 A1 * | 8/2008 | Bohman | ............ | B65D 90/0013 |
| | | | | 410/82 |
| 2013/0251473 A1 * | 9/2013 | Metternich | ............. | B60P 7/132 |
| | | | | 410/77 |

FOREIGN PATENT DOCUMENTS

| | | | | | |
|---|---|---|---|---|---|
| DE | 202008011526 U1 | * | 2/2010 | .............. | B60P 7/132 |
| GB | 2183713 B | * | 11/1989 | .............. | B60P 7/132 |
| KR | 20210096524 A | * | 8/2021 | | |
| WO | WO-2022128785 A1 | * | 6/2022 | | |

* cited by examiner

REMOTELY CONTROLLED TWISTLOCK ASSEMBLY

TECHNICAL FIELD

The field of this invention generally relates to twistlock assemblies for securing shipping containers to the chassis of trucks and the like, and more particularly to twistlock assemblies that can be operated by remote control.

BACKGROUND

Twistlock assemblies were developed to secure shipping containers to semi-trailer container chassis and flatbeds. There are typically four twistlock assemblies per container chassis, and each twistlock assembly includes a housing and a T-shaped locking pin. A twistlock housing has a hole for the T-shaped locking pin and can be, but is not limited to, a cantilever type welded to container bolster ends, drop-in type welded in a cutout of the bolster ends, or simply a shearblock welded into a bolster tube forming a housing. The T-shaped twistlock locking pin fits inside a hole in the twistlock housing and can be rotated from an unlocked position to a locked position. When a shipping container is loaded on a container chassis, the four corner castings on the shipping container rest on the top of each twistlock housing. The locking pin protrudes upward through the rectangular ISO aperture hole of each corner casting and can be rotated to locked position so that the shipping container is locked to the container chassis. This locking action enables safe and secure transporting of the shipping container.

Operation of each twistlock is typically accomplished manually by a person standing on the ground in front of each twistlock assembly. Once the container is loaded onto the four opened twistlocks on the chassis, the twistlocks are manually locked by moving a handle attached to the bottom of the twistlock locking pin about a quarter turn to place the head of the T-shaped twistlock locking pin perpendicular to the corner casting aperture hole. To open the lock the manual procedure is reversed by moving the handle in the opposite direction. Normally, these operations are done by the driver of the vehicle, who must walk around the container chassis to operate all four locks with the chassis stopped in a heavy vehicle operation area.

SUMMARY

It is an object of the present invention to provide a chassis twistlock assembly that can be operated by remote control.

The remotely controlled twistlock assembly according to the invention includes a T-shaped twistlock locking pin and a twistlock housing within which the T-shaped twistlock locking pin is mounted. A motion converter is mounted within the twistlock housing and is connected to the T-shaped twistlock locking pin. A remotely controlled pin actuator is linked to the motion converter in a manner such that extension and retraction of the pin actuator causes rotation of the motion converter and the T-shaped twistlock locking pin. A latch is mounted within the twistlock housing and is engageable with the motion converter such that the latch locks the motion converter when the latch is engaged with the motion converter and unlocks the motion converter when the latch is disengaged from the motion converter. A remotely controlled latch actuator is linked to the latch in a manner such that retraction and extension of the latch actuator controls engagement and disengagement of the latch with the motion converter. At least one feedback device is mounted within the twistlock housing and is positioned to provide remote reporting of a position of at least one of the motion converter and the latch.

The invention enables quick and safe locking and unlocking of twistlock assemblies, by allowing the driver of a container chassis vehicle to lock and unlock the container twistlock assemblies while the driver is still in the truck cab by push-button operation from a control box inside the truck cab, thereby saving time by speeding up the locking and unlocking process and increasing personal safety of the driver of the truck by reducing risk for personal injuries.

Furthermore, the invention accomplishes these results in a very efficient and safe way, by providing a secondary safety latch that prevents the locking pin from moving unless the latch is released. The design of the twistlock assembly allows either hydraulic, pneumatic, or electrical power to twist the twistlock locking pin and move the safety latch.

The details of various embodiments of the invention are set forth in the accompanying drawings and the description below. Numerous other features and advantages of the invention will be apparent from the description, the drawings, and the claims.

DETAILED DESCRIPTION

Figure 1:
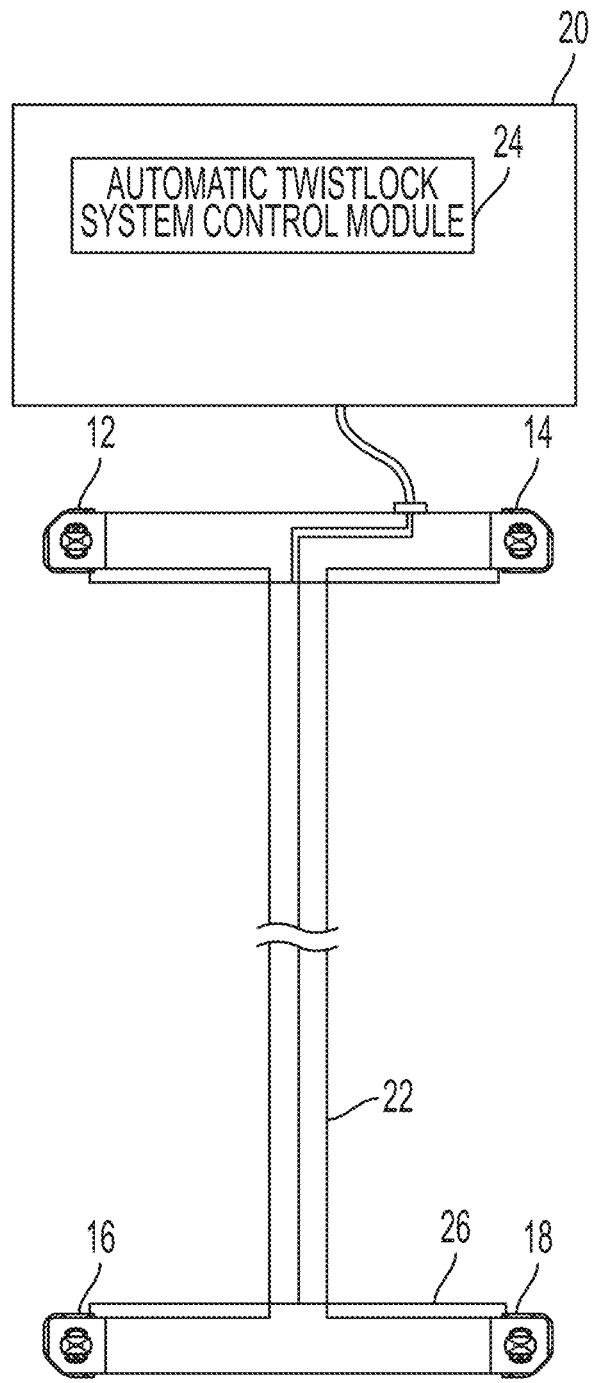
FIG. 1 is a schematic diagram of the layout of a semi-trailer truck cab and a container chassis on which four remotely controlled twistlock assemblies according to the invention are mounted.

With reference to FIG. 1, there is shown a schematic diagram of the layout of a semi-trailer truck cab 20 (represented schematically by a rectangular box) and a container chassis 22 on which four remotely controlled twistlock assemblies according to the invention are mounted: front roadside twistlock assembly 12, front curbside twistlock assembly 14, rear roadside twistlock assembly 16, and rear curbside twistlock assembly 18. Each of the four twistlock assemblies has a twistlock housing that is welded to one of the ends of the chassis bolsters (the chassis bolsters overlapping the profile of the housing so that the chassis bolsters can be welded onto the outside of the housing). A twistlock system control module 24 inside semi-trailer truck cab 20 is connected to the four twistlock assemblies by control lines 26, which may operate to control the twistlock assemblies in different embodiments of the invention by means of compressed air, or hydraulically, or electrically.

Figure 2:
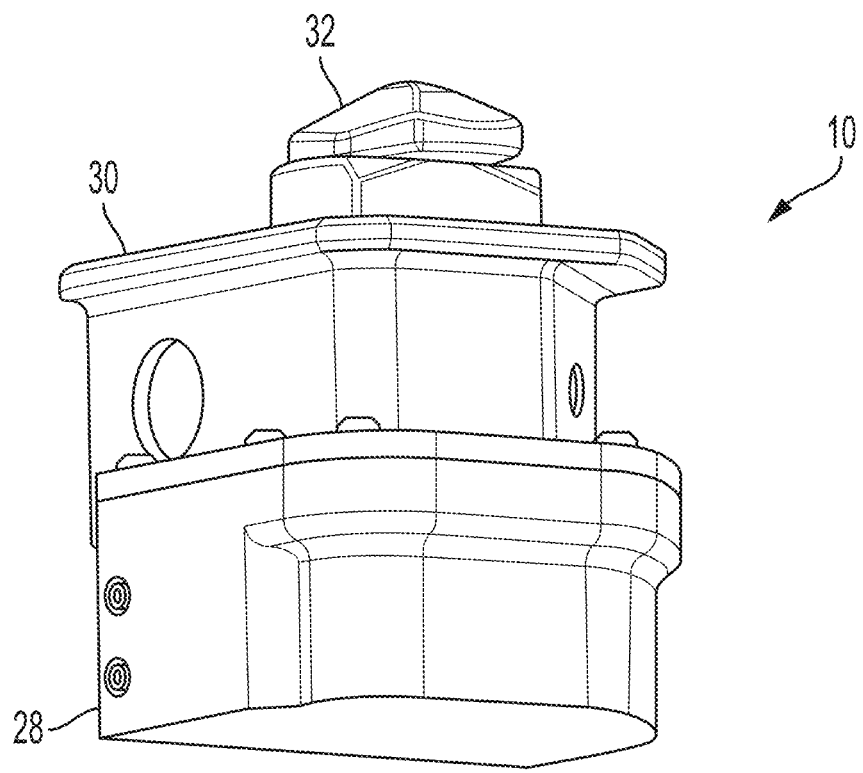
FIGS. 2 and 3 are perspective views of a remotely controlled twistlock assembly according to the invention, shown with its protective cover.
Figure 3:
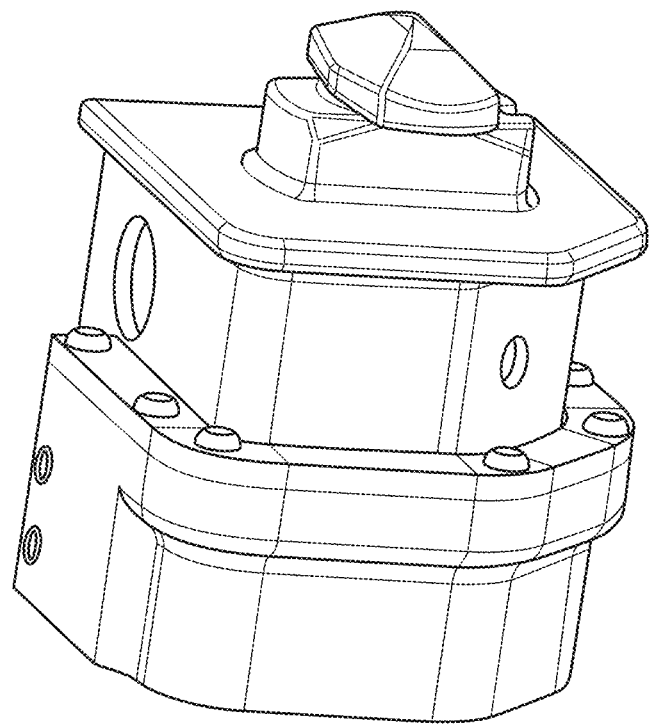

FIGS. 2 and 3 are perspective views of a remotely controlled twistlock assembly 10 that may serve as either front curbside twistlock assembly 14 or rear roadside twistlock assembly 16 in FIG. 1 (front roadside twistlock assembly 12 and rear curbside twistlock assembly 18 in FIG. 1 would be mirror opposites of twistlock assembly 10). Twistlock assembly 10 includes twistlock housing 30, and a protective cover 28 protects the various components found within the lower portion of twistlock housing 30. Mounted within twistlock housing 30 is twistlock pin 32, which is illustrated in FIGS. 2 and 3 in its locked position.

Figure 4:
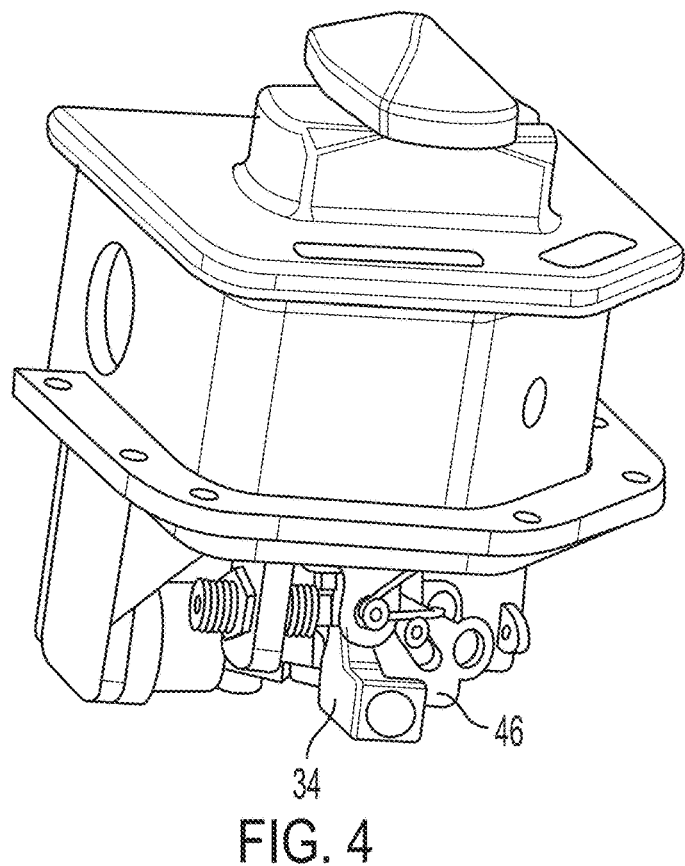
FIGS. 4 and 5 are perspective views corresponding to FIGS. 2 and 3 respectively, showing the remotely controlled twistlock assembly without its protective cover.
Figure 5:
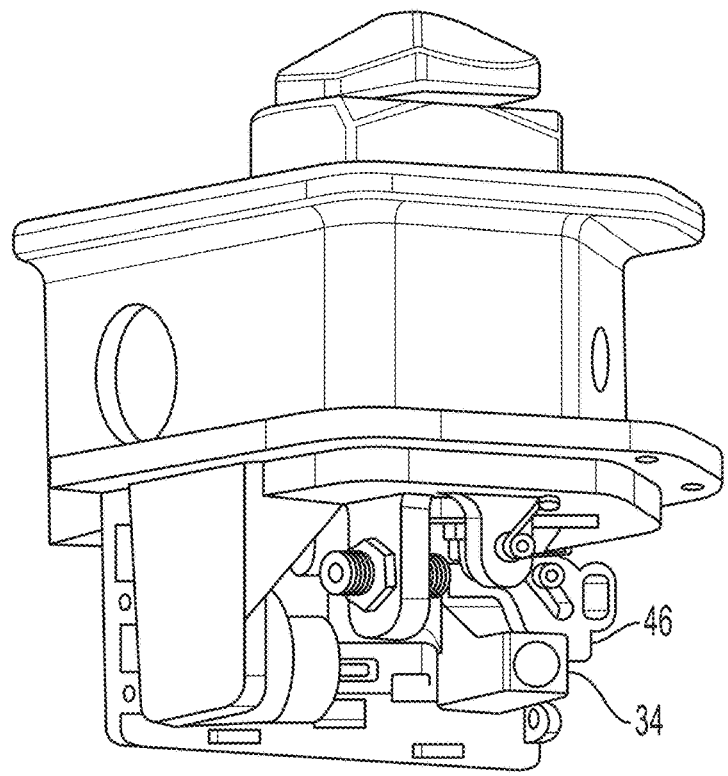
Figure 6:
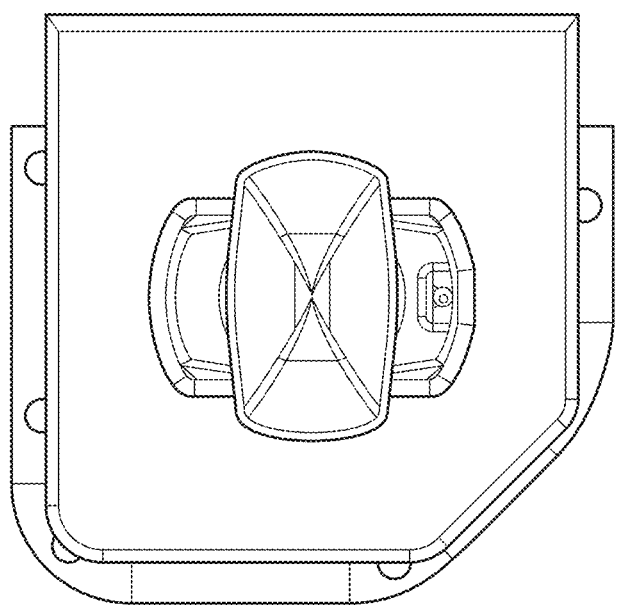
FIG. 6 is a top view of the twistlock assembly of FIGS. 4 and 5.
Figure 7:
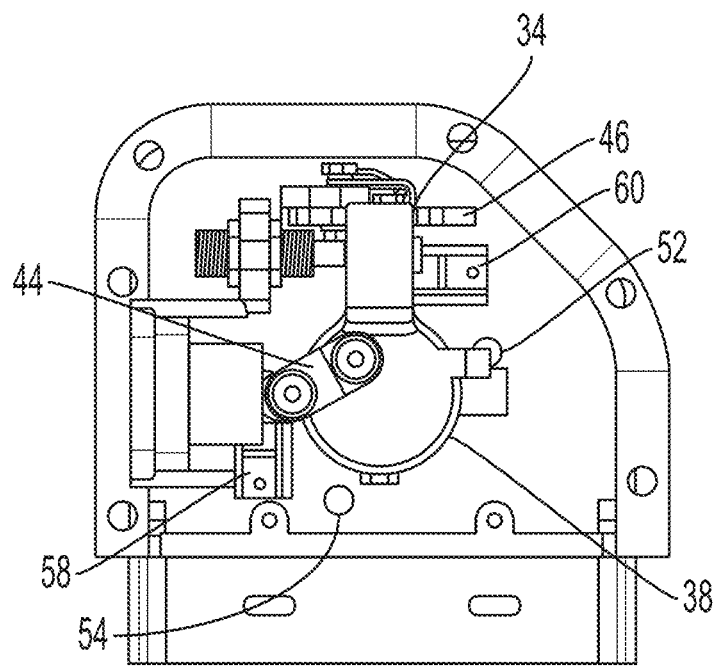
FIG. 7 is a bottom view of the twistlock assembly of FIGS. 4 and 5.
Figure 8:
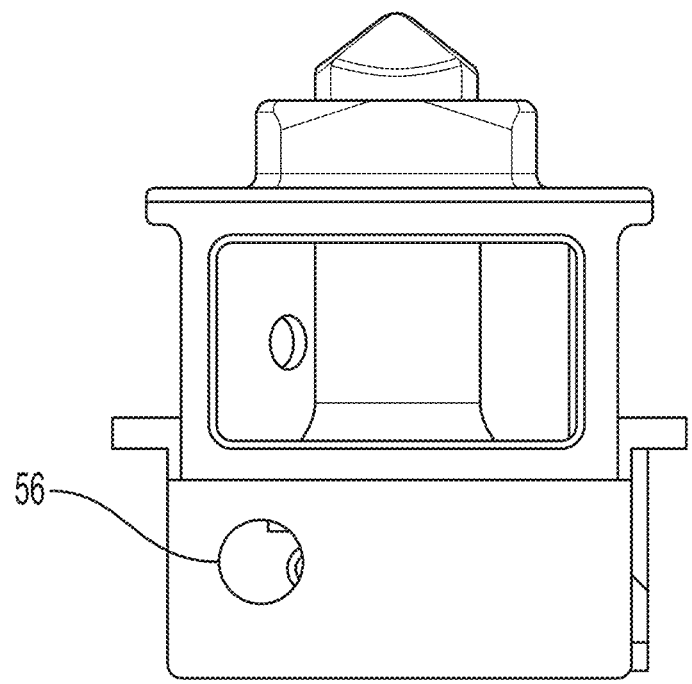
FIGS. 8-11 are side views of the twistlock assembly of FIGS. 4 and 5, as viewed from each of four orthogonal directions.
Figure 9:
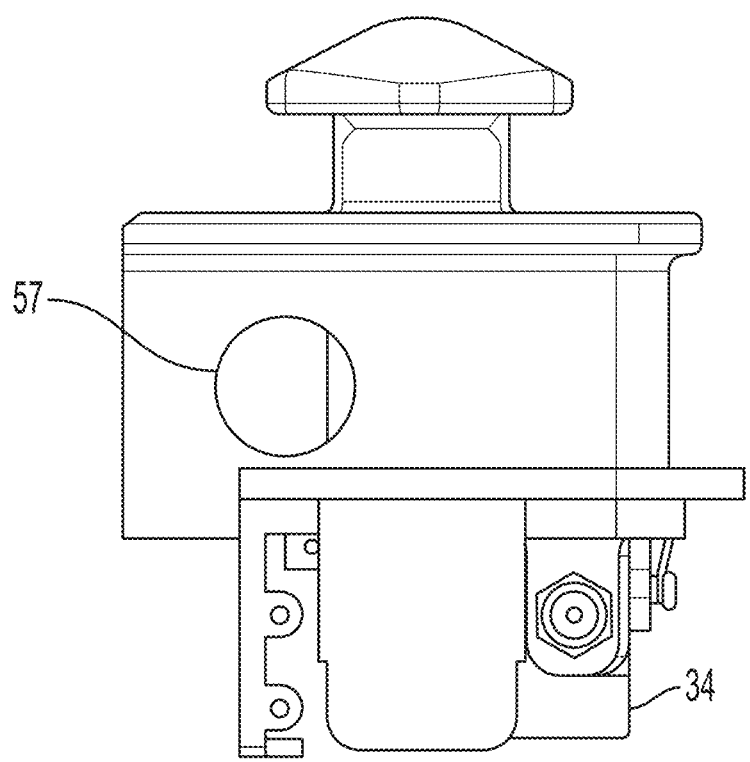
Figure 10:
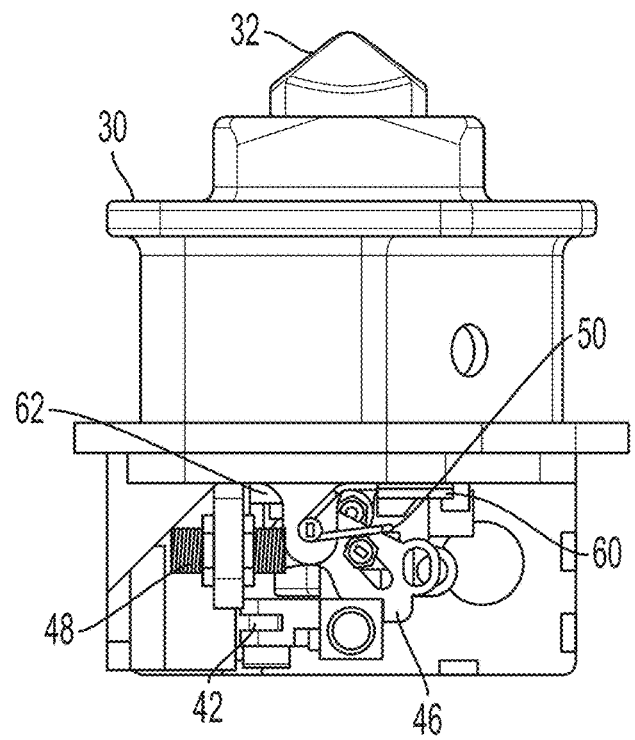
Figure 11:
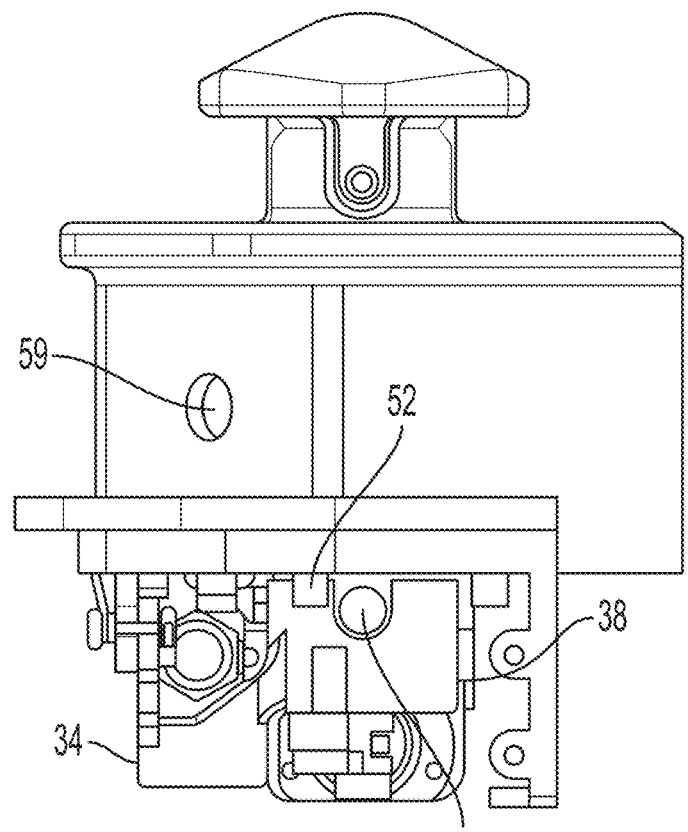

FIGS. 4 and 5 are perspective views of remotely controlled twistlock assembly 10 without its protective cover, and FIGS. 6-11 show remotely controlled twistlock assembly 10, without its protective cover, as seen from various directions.

Twistlock pin 32, twistlock housing 30, and the components within twistlock housing 30 can all be made of metal. Protective cover 28 (shown in FIGS. 2 and 3) could be made of metal, polymer, composite, or similar material.

Twistlock pin 32 is connected to a motion converter 38, which is one piece in the form of a solid cylinder and a handle 34 (although "handle" 34 is not operated by hand as in traditional twistlock assemblies). A pin actuator 42 is attached to motion converter 38 by a pin actuator linkage 44 with two fasteners, so as to enable pin actuator 42 to cause rotation of motion converter 38 when pin actuator 42 is extended or retracted linearly. Motion converter 38 with its linkage to pin actuator 42 changes a linear motion to a twisting motion, and the design of the motion converter and the pin actuator can differ from the design illustrated in the figures depending on the type of twistlock to which the motion converter is fitted and the available space in the housing area, since many variations of the twistlock housing are possible.

A latch 46 is engageable with handle 34 of motion converter 38, so as to lock motion converter 38 when latch 46 is engaged with motion converter 38 and to unlock motion converter 38 when latch 46 is disengaged from motion converter 38. A latch actuator 48 is attached to latch 46 so as to cause latch to be engaged with motion converter 38 when latch actuator 48 is retracted linearly and to be disengaged from motion converter 38 when latch actuator 48 is extended linearly.

Latch actuator 48 has a spring installed internally (a spring return actuator) to ensure a fail-safe operation. The internally installed spring causes latch actuator 48 to retract and pull latch 46 down on handle 34 in the event of loss of air pressure, hydraulic pressure, or electric power (depending on whether control is pneumatic, hydraulic, or electric). Thus, latch actuator 48 will extend only if the pneumatic, hydraulic, or electric control causes extension of the latch actuator through applied force. An externally mounted latch spring 50 provides a second level of fail-safe operation. Latch spring 50 forces latch 46 downwards into engagement with motion converter 38 in the absence of any other forces (latch spring 50 would not be needed except in case of a mechanical problem).

A load stop 40 is attached to motion converter 38 at a circumferential position 90 degrees from the circumferential position of handle 34 of motion converter 38. Load stop 40 prevents twistlock pin 32 from pulling out of twistlock assembly 10 if a container lifts up from the container chassis without twistlock being unlocked. Thus, load stop 40 keeps twistlock pin 32 in place. Also, cylindrical bosses 52 and 54 extend downwards from twistlock housing 30 to engage with load stop 40 so as to prevent rotation of motion converter 38 beyond two rotational positions 90 degrees apart from each other.

A first sensor 58 detects the presence of load stop 40 when twistlock pin 32 is in the unlocked position and a second sensor 60 detects the presence of load stop 40 when twistlock pin 32 is in the locked position. A third sensor 62 detects whether latch 46 is engaged with handle 34 of motion converter 38, which is important because the latch is required under Department of Transportation regulations. Sensors 58, 60, and 62 may be inductive proximity sensors (for example, sensors 58 and 60 may use a magnetic mechanism to sense proximity of load stop 40). Sensors 58, 60, and 62 provide confirmation of the locked or unlocked status of the remotely controlled twistlock pin 32, as well as confirmation whether the locking of the twistlock pin is secured by latch 46, so that the driver of the semi-trailer truck need not exit the cab to visually inspect the twistlock assemblies. Furthermore, the sensors can be relied upon to ensure that twistlock pin 32 is not in an intermediate position. Such an unsafe intermediate position should not ordinarily occur, but the sensors provide additional security against this possibility in case pin actuator 42 or latch actuator 48 jams up, or in case the semi-trailer truck backs into something and causes damage to the twistlock assembly. Additionally, if either pin actuator 42 or latch actuator 48 fails during the life of the twistlock assembly, the actuators can be disconnected from the twistlock assembly to allow the twistlock to be operated manually.

An access port 56 in the lower portion of twistlock housing 30 allows control lines to be plumbed through access port 56. The control lines can be, for example, pneumatic, hydraulic, or electric control lines that pass through or alongside the chassis bolster. A hole 57 in twistlock housing 30 is provided for an ABS light and a smaller hole 59 in twistlock housing 30 is provided for a safety LED, as is typical of chassis twistlock assemblies.

FIGS. 12-19 illustrate the sequential steps required to move from an unlocked position of twistlock pin 32 (FIGS. 12 and 13), in which a container can be loaded on the container chassis, to a locked and secured position of twistlock pin 32 (FIGS. 18 and 19), in which the container can be securely transported on the container chassis.

Figure 12:
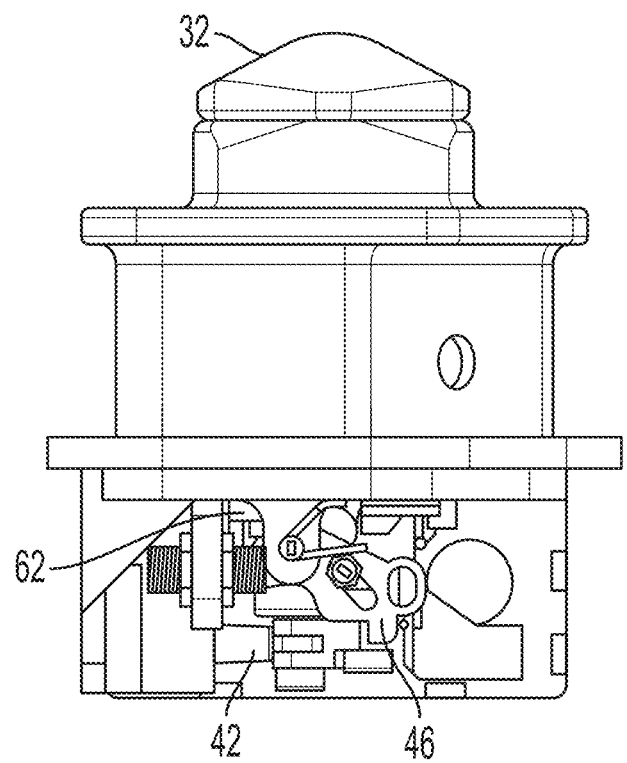
FIGS. 12 and 13 are side and bottom views, respectively, corresponding to FIGS. 10 and 7, but showing the locking pin of the twistlock assembly in the unlocked position so a container can be loaded.
Figure 13:
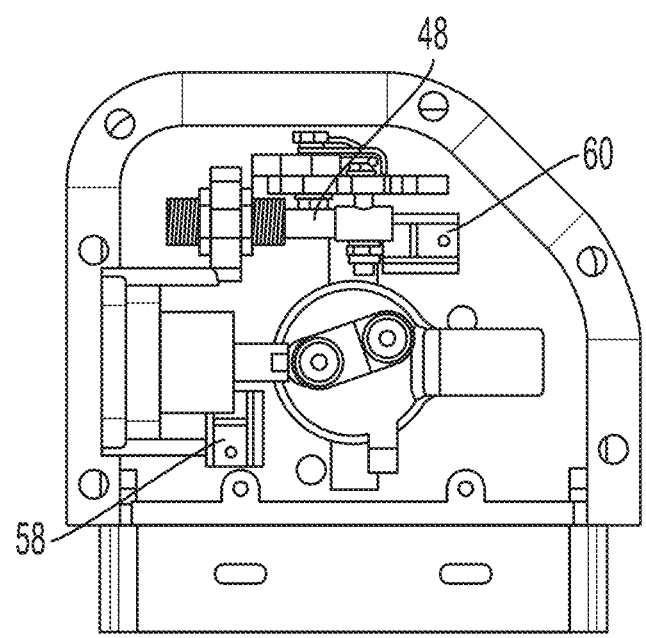

In the unlocked position of FIGS. 12 and 13, pin actuator 42 is extended, so as to cause motion converter 38 to be in a rotational position corresponding to the unlocked position of twistlock pin 32. Latch actuator 48 is in its retracted position, when latch 46 is in its lowered position.

Figure 14:
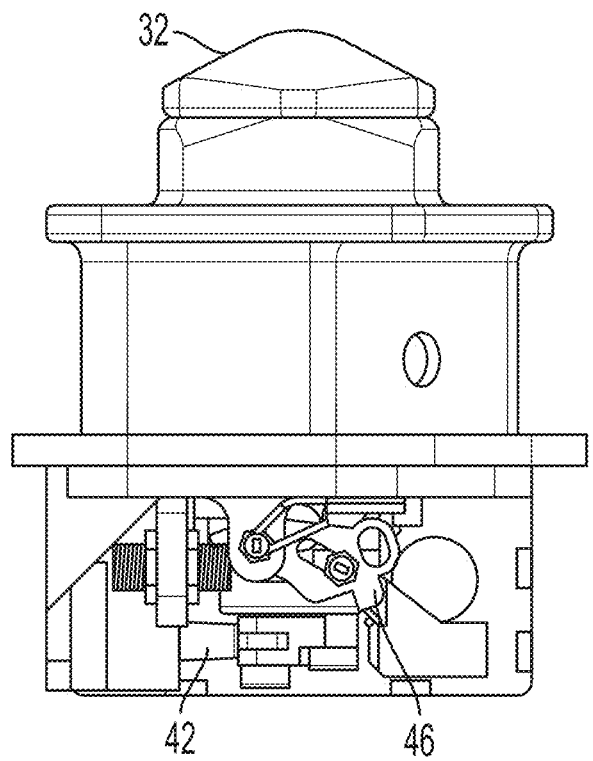
FIGS. 14 and 15 are side and bottom views, respectively, corresponding to FIGS. 12 and 13, but showing the latch actuator of the twistlock assembly extended and the latch of the twistlock assembly lifted so that the locking pin can be locked.
Figure 15:
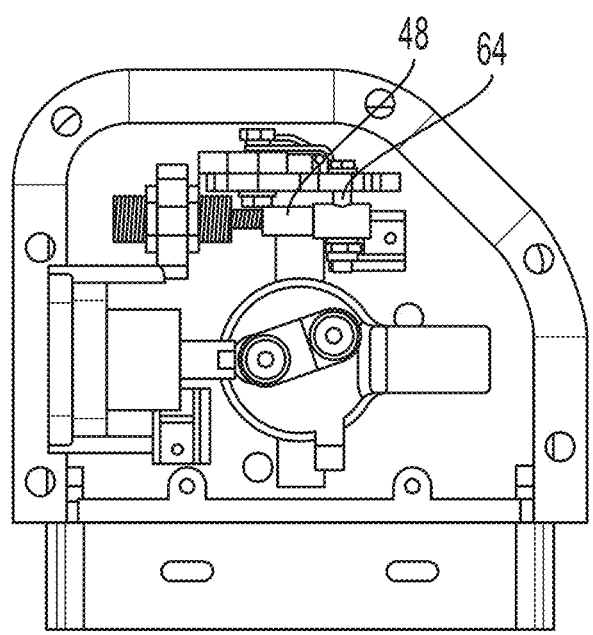

To lock twistlock pin 32, latch actuator 48 must be extended, as shown in FIGS. 14 and 15, so that latch 46 is rotated upwards into its raised position. A latch actuator linkage 64, in the form of a bolt or pin passing through a slot in latch 46, is held by a nut in a hole in the end of latch actuator 48. Latch actuator linkage 64 links actuator 48 with latch 46 so that extension and retraction of latch actuator 48 causes lifting or lowering of latch 46 pivoting around a latch axle bolt 65 on a tab on twistlock housing 30.

Figure 16:
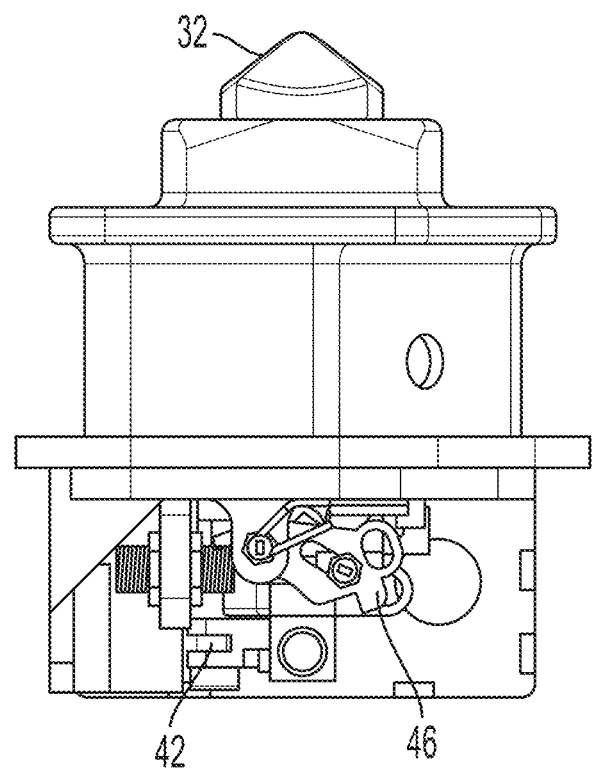
FIGS. 16 and 17 are side and bottom views, respectively, corresponding to FIGS. 14 and 15, but showing the pin actuator of the twistlock assembly retracted and the locking pin rotated into the locked position.
Figure 17:
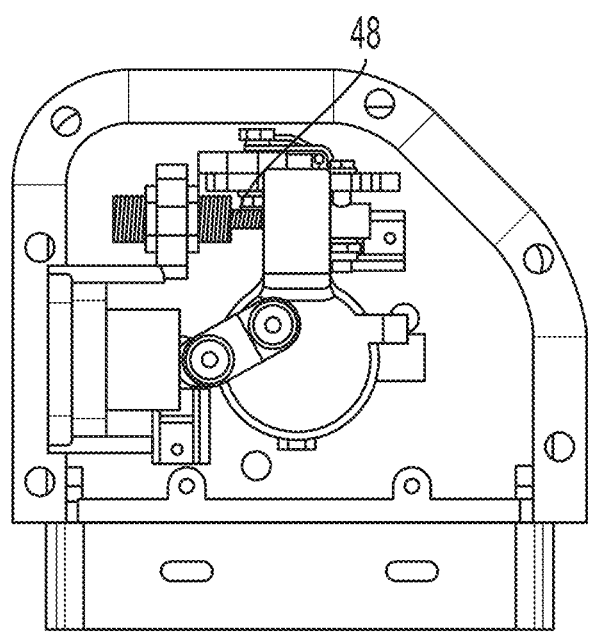
Figure 18:
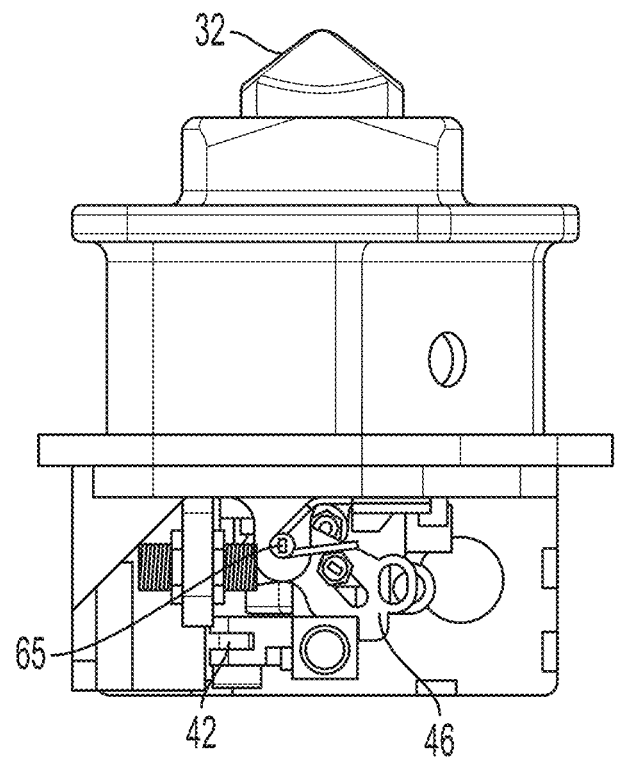
FIGS. 18 and 19 are side and bottom views, respectively, corresponding to FIGS. 16 and 17, but showing the latch actuator retracted so the latch is engaged on the motion converter of the twistlock assembly, so that a container can now be transported on the container chassis.
Figure 19:
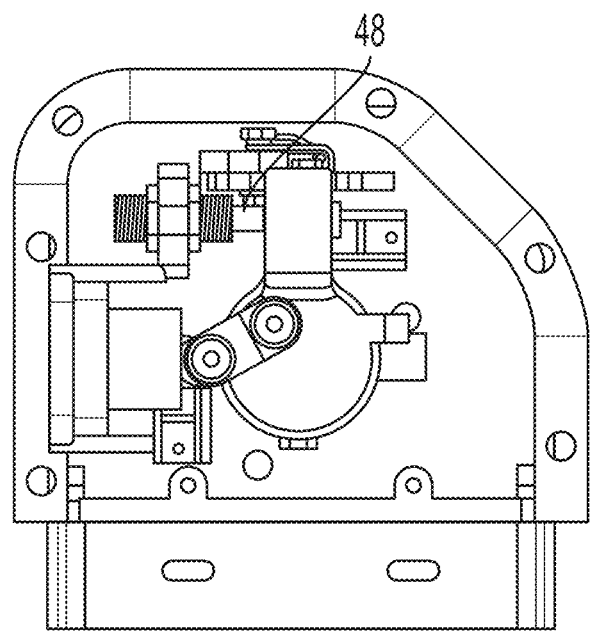

Next, as shown in FIGS. 16 and 17, pin actuator 42 is retracted, thereby causing motion converter 38 and therefore also twistlock pin 32 to be rotated to a rotational position corresponding to the locked position of the twistlock pin.

Finally, to secure twistlock pin 32 in the locked position, latch actuator 48 is retracted, causing latch 46 to be rotated into its lowered position so that latch 46 is engaged on motion converter 38.

What has been described is a remotely controlled twistlock assembly. While a particular form of the invention has been illustrated and described, it will be apparent that various modifications and combinations of the invention detailed in the text and drawings can be made without departing form the spirit and scope of the invention. Accordingly, it is not intended that the invention be limited, except as by the appended claims.

What is claimed is:

1. A remotely controlled twistlock assembly, comprising:
    a T-shaped twistlock locking pin;
    a twistlock housing within which the T-shaped twistlock locking pin is mounted;
    a motion converter mounted within the twistlock housing and connected to the T-shaped twistlock locking pin;
    a remotely controlled pin actuator linked to the motion converter in a manner such that extension and retraction of the pin actuator causes rotation of the motion converter and the T-shaped twistlock locking pin;
    a latch mounted within the twistlock housing and engageable with the motion converter such that the latch locks the motion converter when the latch is engaged with the motion converter and unlocks the motion converter when the latch is disengaged from the motion converter;
    a remotely controlled latch actuator linked to the latch in a manner such that retraction and extension, respectively, of the latch actuator controls engagement and disengagement, respectively, of the latch with the motion converter; and
    at least one feedback device mounted within the twistlock housing and positioned to provide remote reporting of a position of at least one of the motion converter and the latch.

2. A remotely controlled twistlock assembly in accordance with claim 1, further comprising a twistlock system controller connected by control lines to control the remotely controlled pin actuator and the remotely controlled latch actuator.

3. A remotely controlled twistlock assembly in accordance with claim 2, wherein the twistlock system controller controls the remotely controlled pin actuator and the remotely controlled latch actuator pneumatically, hydraulically, or electrically.

4. A remotely controlled twistlock assembly in accordance with claim 1, wherein the motion converter comprises a handle, and wherein the latch engages with the motion converter by engaging the handle.

5. A remotely controlled twistlock assembly in accordance with claim 4, wherein the motion converter comprises a rotatable cylinder and the handle is attached to the circumference of the rotatable cylinder.

6. A remotely controlled twistlock assembly in accordance with claim 1, further comprising a pin actuator linkage with which the pin actuator is attached to the motion converter.

7. A remotely controlled twistlock assembly in accordance with claim 6, wherein the pin actuator linkage is configured and arranged such that the pin actuator causes rotation of the motion converter when the pin actuator is extended or retracted linearly.

8. A remotely controlled twistlock assembly in accordance with claim 1, wherein the latch actuator is attached to the latch so as to cause the latch to be engaged with and lock the motion converter when the latch actuator is retracted linearly and to be disengaged from and unlock the motion converter when the latch actuator is extended linearly.

9. A remotely controlled twistlock assembly in accordance with claim 1, further comprising at least one spring arranged to cause the latch actuator to cause the latch to engage with and lock the motion converter in the absence of external force applied to the latch actuator.

10. A remotely controlled twistlock assembly in accordance with claim 1, further comprising a load stop attached to the motion converter and configured so as to prevent the T-shaped twistlock locking pin from pulling out of the twistlock housing.

11. A remotely controlled twistlock assembly in accordance with claim 1, further comprising a plurality of bosses extending from the twistlock housing and configured to prevent rotation of the motion converter beyond two rotational positions.

12. A remotely controlled twistlock assembly in accordance with claim 11, wherein the two rotational positions are about ninety degrees apart from each other.

13. A remotely controlled twistlock assembly in accordance with claim 11, wherein the bosses are configured to engage with a load stop attached to the motion converter to prevent rotation of the motion converter beyond the two rotational positions.

14. A remotely controlled twistlock assembly in accordance with claim 1, wherein the at least one feedback device comprises a sensor configured to sense when the motion converter is positioned such that the T-shaped twistlock locking pin is in one of an unlocked position or a locked position.

15. A remotely controlled twistlock assembly in accordance with claim 1, wherein the at least one feedback device comprises a first sensor configured to sense when the motion converter is positioned such that the T-shaped twistlock locking pin is in an unlocked position and a second sensor configured to sense when the motion converter is positioned such that the T-shaped twistlock locking pin is in a locked position.

16. A remotely controlled twistlock assembly in accordance with claim 1, wherein the at least one feedback device comprises a sensor configured to sense whether the latch is engaged with the motion converter.

17. A remotely controlled twistlock assembly in accordance with claim 1, wherein the at least one feedback device comprises at least one inductive proximity sensor.

18. A remotely controlled twistlock assembly in accordance with claim 1, wherein the remotely controlled pin actuator and the remotely controlled latch actuator are disconnectable to allow manual operation of the remotely controlled twistlock assembly.

19. A remotely controlled twistlock assembly in accordance with claim 1, further comprising a latch actuator linkage that links the actuator with the latch so that extension and retraction of the latch actuator cause lifting or lowering of the latch relative to the motion converter.

20. A remotely controlled twistlock assembly in accordance with claim 1, further comprising a latch axle mounted on the twistlock housing and around which the latch is pivotable.

\* \* \* \* \*